US012272956B2

(12) United States Patent
DeMuro et al.

(10) Patent No.: US 12,272,956 B2
(45) Date of Patent: Apr. 8, 2025

(54) AUXILIARY-POWER-SUPPLY UNIT, AUXILIARY POWER SUPPLY, AND RELATED SYSTEM AND METHOD

(71) Applicant: Joule Case Inc., Seattle, WA (US)

(72) Inventors: David Mark DeMuro, Seattle, WA (US); James Wagoner, Seattle, WA (US); Alexander Livingston, Seattle, WA (US)

(73) Assignee: JOULE CASE INC., Seattle, WA (US)

( * ) Notice: Subject to any disclaimer, the term of this patent is extended or adjusted under 35 U.S.C. 154(b) by 47 days.

(21) Appl. No.: 17/748,888

(22) Filed: May 19, 2022

(65) Prior Publication Data

US 2022/0376511 A1 Nov. 24, 2022

Related U.S. Application Data

(60) Provisional application No. 63/190,390, filed on May 19, 2021.

(51) Int. Cl.
*H02J 3/32* (2006.01)
*H02J 3/38* (2006.01)

(52) U.S. Cl.
CPC .............. *H02J 3/381* (2013.01); *H02J 3/32* (2013.01)

(58) Field of Classification Search
CPC ...... H02J 3/381; H02J 3/32; H02J 3/14; H02J 13/00016; H02J 13/0005; H02J 9/063; H02J 3/38
USPC ................................................ 307/52
See application file for complete search history.

(56) References Cited

U.S. PATENT DOCUMENTS

2017/0117746 A1\* 4/2017 Kang ............... H02J 9/061
2023/0144421 A1\* 5/2023 Narla ............ H02J 13/00001
307/64

\* cited by examiner

*Primary Examiner* — Elim Ortiz
*Assistant Examiner* — Xuan Ly
(74) *Attorney, Agent, or Firm* — Bryan A. Santarelli; FisherBroyles, LLP

(57) ABSTRACT

In an embodiment, an auxiliary-power-supply unit includes a connector and a controller configured to power a microgrid from a battery in response to determining that the connector is plugged into an outlet of the microgrid, and that the microgrid is uncoupled from a power grid. For example, the connector plugs into a wall outlet of a microgrid in, e.g., a home, and provides, from the battery during a power outage, auxiliary power to the microgrid and, therefore, provides auxiliary power to one or more devices, such as appliances, lights, computers, or televisions, that are connected to the microgrid.

4 Claims, 6 Drawing Sheets

AUXILIARY-POWER-SUPPLY UNIT, AUXILIARY POWER SUPPLY, AND RELATED SYSTEM AND METHOD

RELATED AND PRIORITY APPLICATIONS

This patent application claims priority to U.S. Provisional Patent Application Ser. No. 63/190,390, which is titled AUTOMATIC TRANSFER PLUG MICRO-GRID WITH CONTINUOUS DATA LINK, and which was filed 19 May 2021. The aforementioned provisional patent application is incorporated herein by reference.

SUMMARY

Most structures, including homes, business offices, other business spaces (e.g., restaurants, stores, hotels), stadiums, arenas, cabins, cottages, barns, and sheds rely on municipal and utility power grids (also called "power grids" or "grids") as their main sources of electricity. And power grids typically include one or more of hydroelectric, nuclear, fossil-fuel, or "green" (wind, solar) power plants configured to supply a substantially constant and reliable flow of electricity to such entities.

In spite of the relatively high reliability of power grids, there are times during which a power grid is unable to supply electricity. For example, storms, earthquakes, accidents, maintenance, and equipment failure can all result in the interruption of grid power. During such an interruption of grid power (also called a power outage or a blackout), the owners or inhabitants of structures can implement backup, auxiliary, or other alternative power-supply options.

While grid power is interrupted, the impact on a particular entity can be big or small, and the duration of the power outage can be long or short. Furthermore, the cause of such a power interruption can be similarly diverse and distinct.

No matter the cause or duration, a power outage can range from a mere inconvenience to impacting business, safety, and health.

Solutions to mitigate power outages often involve complicated electronics or systems requiring building modifications that in turn require an electrician or other professional. For example, a homeowner can hire an electrician to install a manual or automatic transfer switch, and to connect a generator to the switch. In the event of a power outage, one flips the transfer switch (manual), or the transfer switch automatically switches (automatic), to disconnect the home's electrical system from the power grid and to connect the generator to the home's electrical system. After the transfer switch is flipped, one can manually start the generator (or the generator may start automatically) to power the home at least until grid power is restored.

Unfortunately, it is not always possible for one to install a transfer switch and a generator. For example, apartment dwellers or those occupying a space for a temporary period of time may be unauthorized to install a transfer switch and a generator.

But even it is possible for one to install a transfer switch and a generator, the cost of acquiring and installing such a back-up, or auxiliary, power system can be prohibitive.

Consequently, a need has arisen for an auxiliary power source, an auxiliary power supply, or other system that is affordable to the average homeowner and business owner and that is relatively easy to install and to use.

An embodiment of an auxiliary power supply can meet such a need.

For example, an embodiment of an auxiliary power supply includes an auxiliary-power-supply unit and a battery. The auxiliary-power-supply unit includes a connector that plugs into a wall outlet of a microgrid in, e.g., a home, and provides, from the battery during a power outage, auxiliary power to one or more devices, such as appliances, lights, computers, or televisions, that are connected to the microgrid.

An embodiment of an auxiliary power supply has a relatively low cost, is relatively easy to install, and can be used to power one or more selected microgrids and devices instead of powering an entire building.

Furthermore, because the auxiliary power supply incorporates a battery instead of a generator, such an auxiliary power supply can be used indoors by, e.g., renters and business owners, and makes little or no noise while operating.

In addition, the auxiliary-power-supply unit can be configured to charge the battery during periods of normal grid operation.

Moreover, the auxiliary power supply can be fully or partially manual, or partially or fully automatic, and can be configured to have safety features that prevent the power supply from electrically shocking, or otherwise injuring, a person using the power supply.

DETAILED DESCRIPTION

Each value, quantity, or attribute herein preceded by "substantially," "approximately," "about," a form or derivative thereof, or a similar term, encompasses a range that includes the value, quantity, or attribute±20% of the value, quantity, or attribute, or a range that includes ±20% of a maximum difference from the value, quantity, or attribute, or ±20% of the difference between the range endpoints. For example, an "approximate" range of b-c is a range of b−20% (c−b) to c+20% (c−b). Furthermore, the terms "a," "an," and "the" can indicate one or more than one of the objects that they modify.

Figure 1:
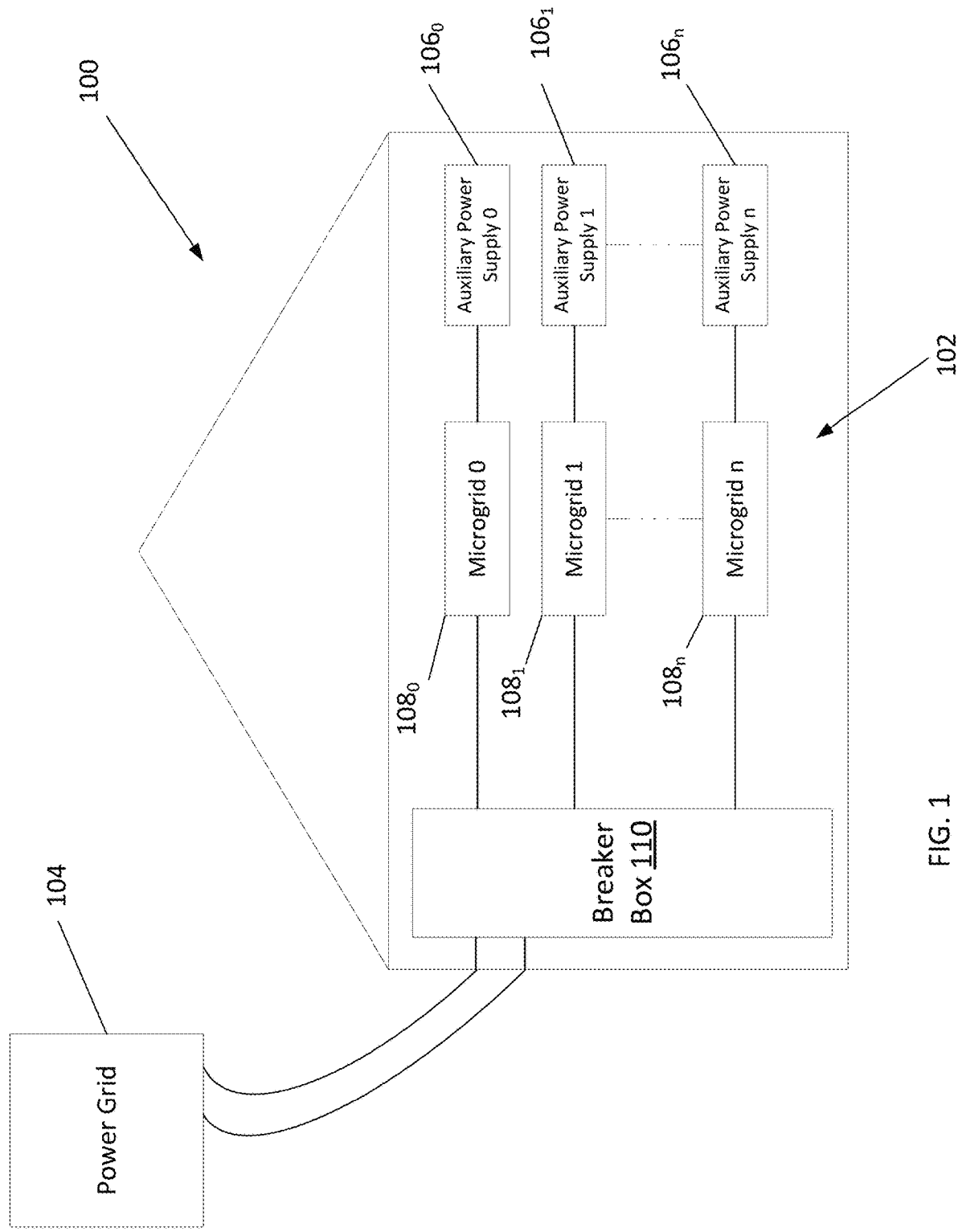
FIG. 1 is a diagram of a building that includes an electrical system coupled to a power grid, according to an embodiment.

FIG. 1 is a diagram of a building 100, which includes an electrical-power system 102 (also called a power system) nominally powered by a power grid 104, but capable of being powered by one or more auxiliary power supplies 106 during periods of interruption of power from the grid (e.g., power outages). The power system 102 includes one or more microgrids 108, which are circuits that each typically include one or more electrical outlets (not shown in FIG. 1) coupled in electrical parallel. Each microgrid 108 is coupled to a breaker box 110 and to a respective auxiliary power supply 106. The breaker box 110 includes at least one respective circuit breaker (not shown in FIG. 2) coupled to each of the microgrids 108. For example, in the U.S., one or more of the microgrids 108 may provide single-phase 110 Volt RMS (VRMS)-120 VRMS power for, e.g., most electronic appliances (e.g., refrigerator), lighting, and devices (e.g., television, computer), and one or more of the other microgrids may provide split-phase 220 VRMS-240 VRMS power for higher-power devices such as air conditioners, stoves, ovens, Jacuzzis, hot tubs, electric clothes dryers, and electric hot-water heaters—"split-phase" means that the power grid 104 provides three lines into the building 100, two 110 VRMS-120 VRMS lines from two end taps of a transformer, and a neutral line that is from a center tap of the transformer.

Still referring to FIG. 1, alternate embodiments are contemplated. For example, although described as having a respective auxiliary power supply 106 for each microgrid 108, one or more microgrids can be configured to receive power from multiple auxiliary power supplies, or one or more microgrids may not be connected to an auxiliary power supply. Furthermore, alternate embodiments described in conjunction with FIGS. 2-6 may be applicable to the embodiments described in conjunction with FIG. 1, and any one or more features described in conjunction with FIG. 1 may be combined with any one or more features described in conjunction with FIGS. 2-6.

Figure 2:
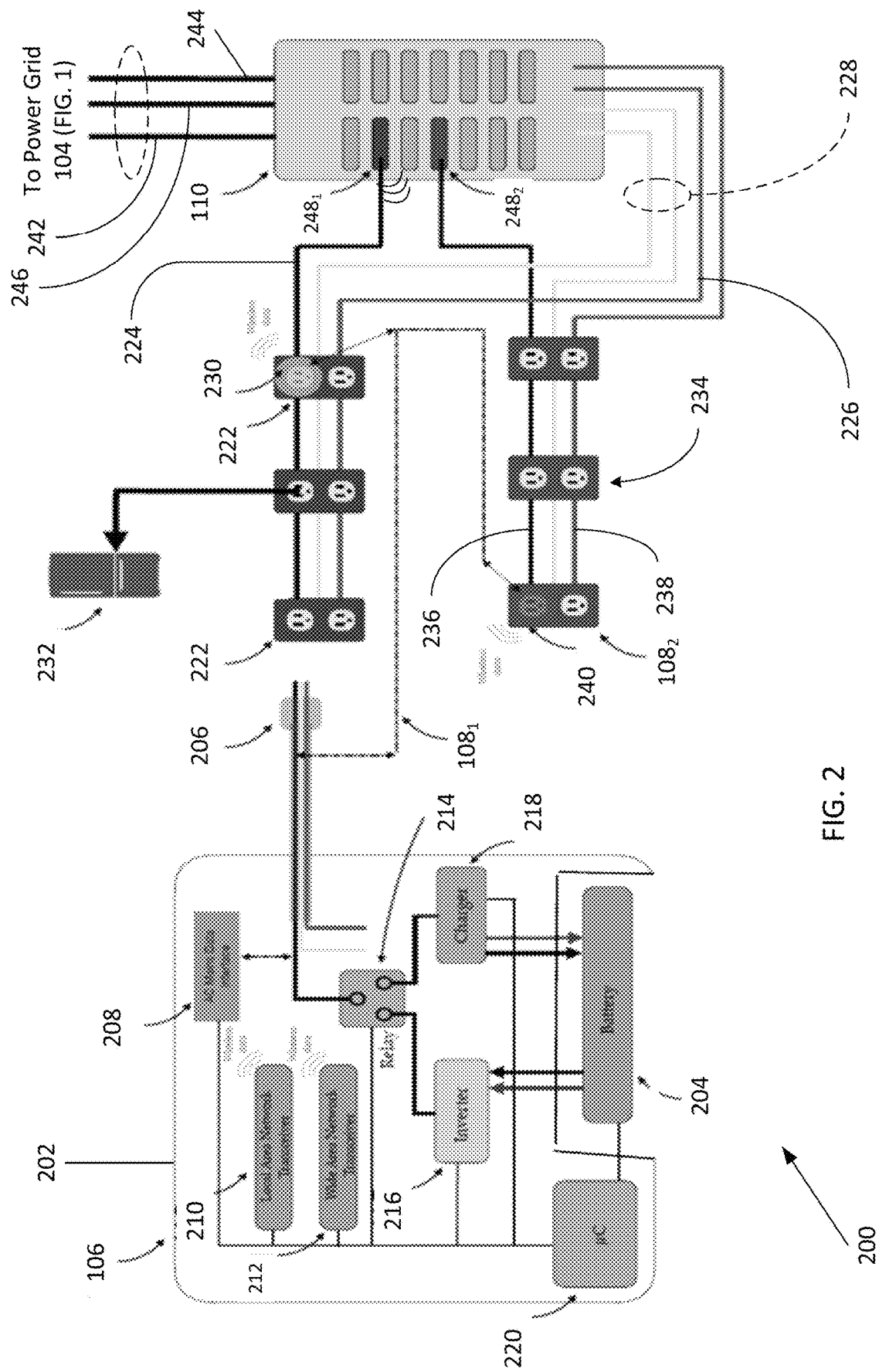
FIG. 2 is a diagram of a subgrid assembly that includes the electrical system of FIG. 1 and an auxiliary power supply coupled to the electrical system, according to an embodiment.

FIG. 2 is a diagram of a portion 200 of the electrical-power system 102 of FIG. 1, according to an embodiment. The portion 200 includes an auxiliary power supply 106, two microgrids $108_1$ and $108_2$, and the breaker box 110. The portion 200 also may be called a subgrid assembly, or a subgrid.

The auxiliary power supply 106 includes an auxiliary-power-supply unit 202 and one or more batteries 204.

The auxiliary-power-supply unit 202 includes a connector (a "plug" in an embodiment) 206, an AC Mains data interface 208, a local area network (LAN) transceiver 210, a wide area network (WAN) transceiver 212, a relay 214, a DC-to-AC inverter 216, a battery charger 218, and a control circuit 220.

The connector 206 can be, for example, a conventional U.S. two-prong (hot, neutral, no ground) or three-prong (hot, neutral, ground) plug configured to engage, respectively, a standard two-receptacle or three-receptacle U.S. wall outlet. For example, as described below, the connector 206 can be inserted into a wall outlet of the microgrid $108_1$ to power the microgrid during an interruption of power from the grid 104.

The AC Mains data interface 208 is configured to receive a signal from a microgrid to which the plug 206 is connected (e.g., the microgrid $108_1$), and to notify the control circuit 220 as to whether the plug is connected to a microgrid and whether the microgrid is receiving grid power.

The LAN transceiver 210 can be a conventional transceiver and is configured to couple, communicatively, the auxiliary-power-supply unit 202 to devices external to the auxiliary-power-supply unit by transmitting and receiving wireless signals such as Wi-Fi® and Bluetooth® signals. For example, the LAN transceiver 210 can be configured to communicate with a microgrid interface (described below) and with a smart device, such as a smart phone.

The WAN transceiver 212 can be a conventional transceiver and is configured to couple, communicatively, the auxiliary-power-supply unit 202 to a WAN such as the internet.

The relay 214 can be a conventional switch or switching device, such as a single-pole, double-throw (SPDT) switch, and is configured to couple the connector 206 to the inverter 216 or to the battery charger 218.

The inverter 216 can be conventional and is configured to convert a DC voltage from the battery 204 to an AC voltage. For example, while the relay 214 is coupling the inverter 216 to the connector 206, the inverter is configured to provide, via the relay and the connector, auxiliary power to a microgrid (e.g., the microgrid $108_1$) to which the connector is connected and to which power from the grid 104 has been interrupted.

The battery charger 218 can be conventional and is configured to charge the battery 204. For example, while the relay 214 is coupling the charger 218 to the connector 206, the charger is configured to charge the battery 204 using grid power from the microgrid (e.g., the microgrid $108_1$) to which the connector is connected.

And the control circuit 220 can be a conventional microprocessor or microcontroller and can be configured to communicate with, to control the configuration of, and/or to control the operation of, the AC Mains data interface 208, the LAN transceiver 210, the WAN transceiver 212, the relay 214, the inverter 216, and the battery charger 218. In an embodiment, the control circuit 220 can implement a safety feature whereby if the control circuit does not detect that the connector 206 is plugged into an outlet 222, then the control circuit disables the inverter 216, controls the relay to disconnect the inverter from the connector 206, or both disables the inverter and controls the relay to disconnect the inverter from the connector to prevent the connector prongs from being energized and potentially electrically shocking one attempting to use the auxiliary power supply 106.

Each of the one or more batteries 204 can be a conventional battery configured to generate a DC signal (frequency of approximately 0 Hz) having a voltage in, for example, an approximate range of 5 VDC-48 VDC.

The microgrid $108_1$ includes one or more electrical outlets 222 connected in electrical parallel across "hot" and "neutral" lines 224 and 226 and connected to an earth ground 228, one or more electronic microgrid interfaces 230 (one microgrid interface included in the microgrid $108_1$), and one or more appliances, such as a refrigerator 232, plugged into one or more of the outlets. The microgrid interface 230 is configured to detect, and to generate a signal indicating, whether power from the grid 104 to the microgrid $108_1$ is interrupted.

The microgrid $108_2$ includes one or more electrical outlets 234 connected in electrical parallel across "hot" and "neutral" lines 236 and 238 and connected to the earth ground 228, and one or more electronic microgrid interfaces 240 (one microgrid interface included in the microgrid $108_2$ in the described embodiment). The microgrid interface 240 is configured to detect, and to generate a signal indicating, whether the microgrid $108_1$ is connected to the power grid 104.

And the breaker box 110 is connected to receive, from the power grid 104, 110 VRMS-120 VRMS (split-phase 220 VRMS-240 VRMS) power on each of the hot lines 242 and 244, and is connected to neutral of the power grid via line 246. Furthermore, the breaker box 110 includes a respective one or more circuit breakers 248 for each microgrid 108; for example, in an embodiment, the breaker box includes one circuit breaker 248₁ for the microgrid 108₁ and another circuit breaker 248₂ for the microgrid 108₂. In an embodiment with one circuit breaker 248 per microgrid 108, each circuit breaker acts as a single-pole-single-throw (SPST) switch inline with the hot wire (e.g., wire 224 or wire 236), and is configured to open or "trip" (i.e., to open, electrically, the normally closed circuit formed by the microgrid) in response to one or more devices plugged into one or more outlets of the microgrid 108 drawing a combined level of current that is above a rated current threshold (e.g., 15 Amperes (A) or 20 A) of the circuit breaker. Such tripping action is designed to prevent the wiring of the microgrid 108 from overheating and potentially starting a fire or otherwise causing damage to the structure (e.g., building) in which the microgrid is installed and to the contents of the structure. Furthermore, as discussed below, one or both of the circuit breakers 248₁ and 248₂ can be configured to be opened manually, or to be opened electronically in response to a signal from one of the LAN and WAN transceivers 210 and 212, and can be configured to generate and to transmit to, e.g., one of the LAN and WAN transceivers, a signal indicative of the state (electrically closed or electrically open) of the circuit breaker.

Still referring to FIG. 2, alternate embodiments of the portion 200 of the electrical system 102 (FIG. 1) are contemplated. For example, the portion 200 can include more or fewer than two microgrids 108. Furthermore, there may be a second auxiliary-power-supply unit 106, one for each of the microgrids 108₁ and 108₂. Moreover, one or both microgrids 108₁ and 108₂ can include more or fewer than three outlets 222 and 234, respectively. In addition, each microgrid 108 can include both microgrid interfaces 230 and 240 or can include a microgrid interface that combines the functionality of both interfaces 230 and 240. Furthermore, although shown connected to neutral via the connector 206, the auxiliary power source 106 can be connected to neutral at a common neutral node at or in the breaker box 110. Moreover, embodiments described in conjunction with FIGS. 1 and 3-6 may be applicable to the portion 200 of the electrical system 102 (FIG. 1), and any one or more features described in conjunction with FIG. 2 may be combined with any one or more features described in conjunction with FIG. 1 and FIGS. 3-6.

Figure 3:
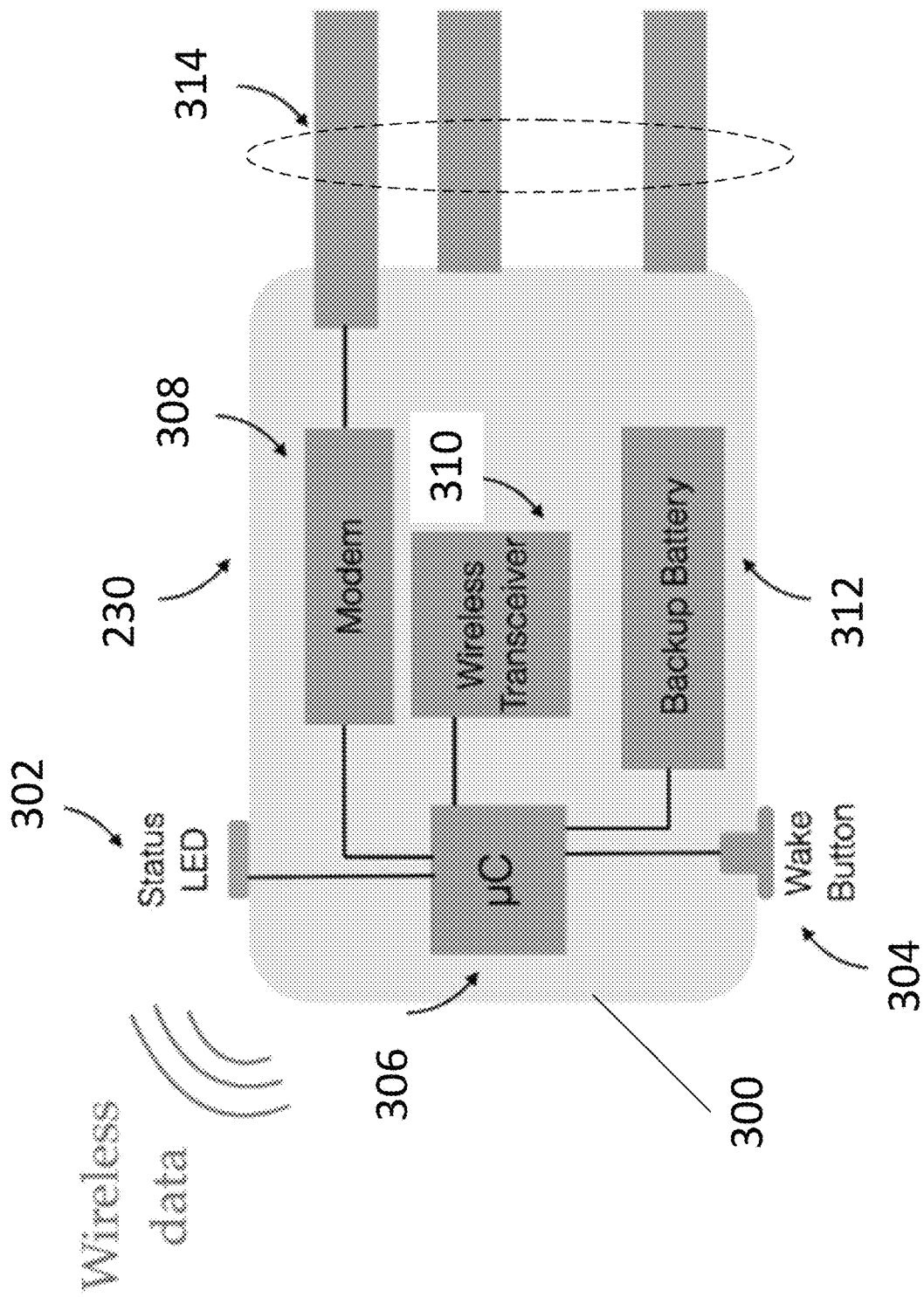
FIG. 3 is a block diagram of a microgrid interface of the subgrid assembly FIG. 2, according to an embodiment.

FIG. 3 is a schematic block diagram of the microgrid interfaces 230 and 240 of FIG. 2, according to an embodiment. For purposes of explanation, the microgrid interface 230 is described in conjunction with FIG. 3, it being understood that the microgrid interface 240 can be similar.

The microgrid interface 230 includes a housing 300, a status light-emitting diode (LED) 302, and a wake button 304, a control circuit 306, a modem 308, a wireless transceiver 310, an optional back-up battery 312 disposed in the housing, and three prongs 314 (hot, neutral, earth ground) configured for engagement with an outlet 222 of the microgrid 108₁ of FIG. 2.

The status LED 302 is configured to indicate, when lit, that the interface 230 is being powered from the microgrid 108₁ via the prongs 314 or via the battery 204. Although described as an LED, the LED 302 may be supplemented or replaced by any device suitable for configuration to indicate that the interface 230 is being powered, i.e., is "on."

The wake button 304 is configured to generate a signal that "awakens" the control circuit 306. For example, the control circuit 306 can be configured to awaken, automatically, in response to the interface 230 being plugged into an outlet 222 of the microgrid 108₁ of FIG. 2 while the microgrid is receiving power from the grid 104 of FIG. 1. But if one plugs in the interface 230 while grid power to the microgrid 108₁ is interrupted, then the control circuit 306 may not awaken automatically. Consequently, the wake button 304 is configured to allow one to manually awaken the control circuit 306, and thus the entire interface 230, by pressing the wake button, if, for example, the interface is first used (e.g., first plugged into the microgrid 108₁) during a power outage. Although described as a pressable button, the wake button 304 may be supplemented or replaced by any device suitable for configuration to generate a wake-up signal to the control circuit 306.

The control circuit 306, which can be a conventional microprocessor or microcontroller and can be the same as or similar to the control circuit 220 of FIG. 2, is configured to control operation of, and to receive signals, such as data signals, from one or more of the status LED 302, modem 308, transceiver 310, and battery 312. In response to one or more of these signals, the control circuit 306 is configured to determine whether a microgrid 108 (FIG. 2) to which the interface 230 is connected is receiving power from the grid 104 (FIG. 1). For example, the control circuit 306 can be configured to execute an algorithm that determines whether a signal having an approximately 60 Hz frequency is on the hot one of the prongs 314. In response to the absence of such an approximately 60 Hz signal on the hot prong 314, the control circuit 306 is configured to cause the modem 308 to generate a power-out signal on the hot prong indicating that microgrid 108 is receiving no power from the grid 104. And the control circuit 306 also can be configured to determine whether grid power has returned to the microgrid 108, even while the auxiliary power source 106 is providing power to the microgrid. For example, the inverter 216 can be configured to generate an AC signal having a frequency that is slightly offset from 60 Hz, for example in an approximate range of 55 Hz-58 Hz and 62 Hz-65 Hz. In response to detecting a beat frequency of a few Hertz on the hot prong 314, the control circuit 306 can be configured to cause the modem 308 to generate, on the hot prong, a signal indicating that grid power has returned to the microgrid 108. And the control circuit 306 can be configured to determine whether the microgrid 108 to which the interface 230 is connected, or another microgrid connected to the breaker box 110 (FIG. 2), is disconnected from the power grid 104 (FIG. 1). For example, the control circuit 306 can be configured to determine whether the circuit breaker 248 that couples a microgrid 108 to the power grid 104 is open or closed by, for example, receiving a wireless signal (via the transceiver 310) from the circuit breaker.

The modem 308 can be a conventional modem configured to generate, on the hot prong 314, and, therefore, on the hot wire of the corresponding microgrid 108, a signal, such as a data signal, that the control circuit 220 of the auxiliary power supply 106 of FIGS. 1-2 can receive and process. The modem 308 also can be configured to receive, from the hot prong 314, a signal generated by the control circuit 220, to convert the signal into a form suitable for reception by the control circuit 306, and to send the converted signal to the control circuit 306 for processing. And the modem 308 can be configured to communicate using a conventional power-line protocol such as the X10 protocol. An example of an integrated circuit suitable for the modem 308 is the TDA5051A, which is manufactured by Texas Instruments, Inc.

The wireless transceiver 310 is configured to facilitate wireless communications between the control circuit 306 and an external device or other external destination such as the control circuit 220 of the auxiliary power supply 106. The transceiver 310 is configured to receive a signal from the control circuit 306, to convert the signal into a form suitable for wireless transmission, and to transmit the converted signal as, for example, a Wi-Fi signal or a Bluetooth signal. The transceiver 310 also is configured to receive a wireless signal (e.g., Wi-Fi or Bluetooth) from an external device or other external source such as the control circuit 220 or a smart phone, to convert the received signal into a form suitable for reception by the control circuit 306, and to send the converted receive signal to the control circuit 306.

The backup battery 312 is a conventional battery or other portable power source configured to power the control circuit 306, and possibly other components onboard the interface 230, while the interface is not plugged into an outlet of a microgrid or while the interface is plugged into a microgrid to which grid power has been interrupted.

The prongs 314 are conventional prongs configured to be inserted into a standard power outlet. For example, if the interface 230 is configured for use in the U.S., the prongs can the hot, neutral, and ground prongs standard in the U.S. Alternatively, the interface 230 can have only two prongs (hot, neutral) 314, or the prongs can be configured conventionally for plugging into outlets in electrical systems configured according to the standards of other countries or regions.

Still referring to FIG. 3, alternate embodiments of the microgrid interface 230 are contemplated. For example, instead of being configured to plug into an outlet of a microgrid, the interface can be configured to connect to the microgrid in a different manner, or can be built into the microgrid or into one of the outlets. Furthermore, although described as configured to generate signals on, and to receive signals from, the hot prong 314, the modem 308 can be configured to generate signals on, and/or to receive signals from, the neutral prong 314. And embodiments described in conjunction with FIGS. 1-2 and 4-6 may be applicable to the microgrid interface 230, and any one or more features described in conjunction with FIG. 3 may be combined with any one or more features described in conjunction with FIGS. 1-2 and FIGS. 4-6.

Figure 4:
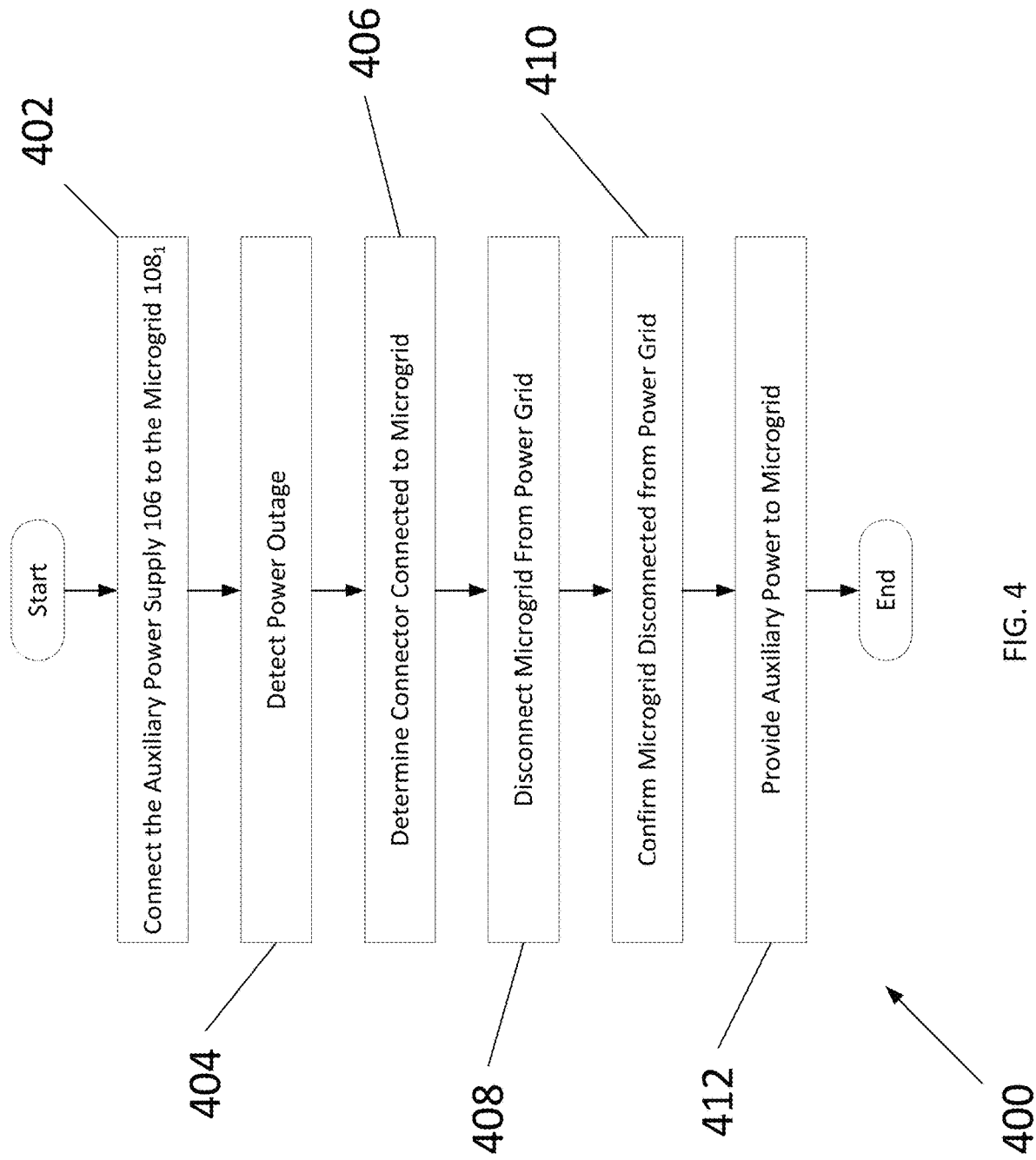
FIG. 4 is a flow diagram of a procedure for using the auxiliary power supply of FIG. 2 to provide power to a microgrid of FIG. 2 during an interruption in grid power, according to an embodiment.

FIG. 4 is a flow diagram 400 of a procedure for detecting a power outage in a grid such as the grid 104 (FIG. 1) and for providing auxiliary power to one or more microgrids 108 (FIGS. 1-2) with an auxiliary power supply 106 (FIGS. 1-2), according to an embodiment.

An embodiment of a procedure represented by the flow diagram 400 is described with reference to FIGS. 1-4. Furthermore, functions and operations attributed to the auxiliary power supply 106 can be performed by any one or more components of the auxiliary power supply, such as the control circuit 220. Similarly, functions and operations attributed to the microgrid interfaces 230 and 240 can be performed by any one or more components of the respective interfaces, such as the respective instantiations of the control circuit 306.

First, at a step 402, one connects the auxiliar power supply 106 to the microgrid $108_1$. For example, one plugs the connector 206 into an outlet 222 of the microgrid $108_1$. Alternatively, one could connect the auxiliary power supply 106 to the circuit breaker $248_1$ using, for example, Anderson Powerpole connectors.

Next, at a step 404, the auxiliary power supply 106 detects a power outage on the power grid 104. For example, in response to detecting no grid power on the microgrid $108_1$, the microgrid interface 230 generates, on the hot wire 224 of the microgrid, a signal indicating an absence of grid power; this signal can be a digital signal or an analog signal and have any suitable waveform.

Then, at a step 406, the auxiliary power supply 106 determines whether the auxiliary power supply is connected to the microgrid $108_1$. For example, the auxiliary power supply 106 determines that the auxiliary power supply is connected to the microgrid $108_1$ if it receives the power-outage signal from the microgrid interface 230. That is, the power-outage signal can serve at least two purposes: 1) inform the auxiliary power supply 106 that grid power is out on the microgrid $108_1$, and 2) indicate that the auxiliary power supply is connected to the microgrid $108_1$. In such an embodiment, the steps 404 and 406 effectively collapse into a single step. In another embodiment, the interface 230 can poll the auxiliary power source 106 periodically. If the interface 230 determines that the connector 206 is not plugged into an outlet 222, then the interface can notify a user, for example, with an audible alarm or by sending a wireless signal (e.g., a Bluetooth signal) to a device, such as a smartphone, of the user, and the user can plug in the connector to an outlet or can manually deactivate the auxiliary power source 106. Alternately, the interface can send a wireless signal that causes the auxiliary power source 106 to deactivate itself.

Next, at a step 408, the microgrid $108_1$ is disconnected from the power grid 104. In an automatic embodiment, the circuit breaker $248_1$ is a smart breaker, the auxiliary power supply 106 sends a wireless signal to the smart circuit breaker, and in response to the signal, the smart circuit breaker electrically opens to disconnect the microgrid from the power grid. In a manual embodiment, the auxiliary power supply 106 notifies a user that the grid power is out, and the user manually opens the circuit breaker $248_1$. For example, the auxiliary power supply 106 can notify the user to open the circuit breaker $248_1$ by transmitting a signal (e.g., a Bluetooth signal) to the user's smart phone, on which is installed an application that causes the phone to notify the user of the power outage; alternatively, the auxiliary power supply can notify the user in any other suitable manner.

Then, at a step 410, the auxiliary power supply 106 confirms that the microgrid $108_1$ is disconnected from the power grid 104. For example, the auxiliary power supply 106 makes this confirmation so that the auxiliary power supply does not couple auxiliary power into the power grid 104. In an automatic embodiment, the circuit breaker $248_1$ is a smart breaker, which generates a transmits a signal on the hot wire of the microgrid $108_1$, or wirelessly, to the auxiliary power supply 106 confirming that the smart circuit breaker is electrically open. In another automatic embodiment, in response to no longer being connected to the microgrid $108_1$ through the circuit breakers $248_1$ and $248_2$, and, therefore, in response to no longer receiving the power-outage signal generated by the microgrid interface 230, the microgrid interface 240 transmits a wireless signal to the auxiliary power supply 106 indicating that the microgrid interface 240 is no longer receiving the power-outage signal, and the auxiliary power supply interprets this signal as confirmation that the circuit breaker $248_1$ is open. In a manual embodiment, the user, via an application on his smart device, causes the smart device to transmit, to the auxiliary power supply 106, a signal indicating that the user has manually opened the circuit breaker $248_1$. And in a combination automatic and manual embodiment, the user, via an application on his smart device, informs the auxiliary power supply 106 that he has opened the circuit breaker $248_1$, the microgrid interface 240 transmits, to the auxiliary power supply, a wireless signal indicating that it is no longer receiving the power-outage signal generated by the microgrid interface 230, and the auxiliary power supply interprets the signal from the microgrid interface 240 as confirmation that the user has opened the circuit breaker $248_1$.

Next, at a step 412, the auxiliary power supply 106 generates auxiliary power, and provides the auxiliary power to the microgrid $108_1$ and, therefore, powers one or more devices (e.g., refrigerator 232) connected to the microgrid. In an embodiment, the control circuit 220 causes the relay 214 to couple the inverter 216 to the connector 206, which is plugged into an outlet 222, and activates the inverter to generate, from a DC voltage signal generated by the battery 204, an AC auxiliary power signal (e.g., a 110 VRMS-120 VRMS) that has an approximately sinusoidal wave shape and a frequency of approximately 60 Hz (as described above, the frequency of the auxiliary power signal may be offset from 60 Hz).

Still referring to FIG. 4, alternate embodiments of the procedure represented by the flow diagram 400 are contemplated. For example, the auxiliary power supply 106 can be configured to provide auxiliary power to more than one microgrid 108. Furthermore, the electrical system 102 can include multiple auxiliary power supplies 106, each of which operates in a manner similar to, or the same as, the manner described in conjunction with FIG. 4. In addition, embodiments described in conjunction with FIGS. 1-3 and 5-6 may be applicable to the procedure represented by the flow diagram 400, and any one or more features described in conjunction with FIG. 4 may be combined with any one or more features described in conjunction with FIGS. 1-3 and FIGS. 5-6.

Figure 5:
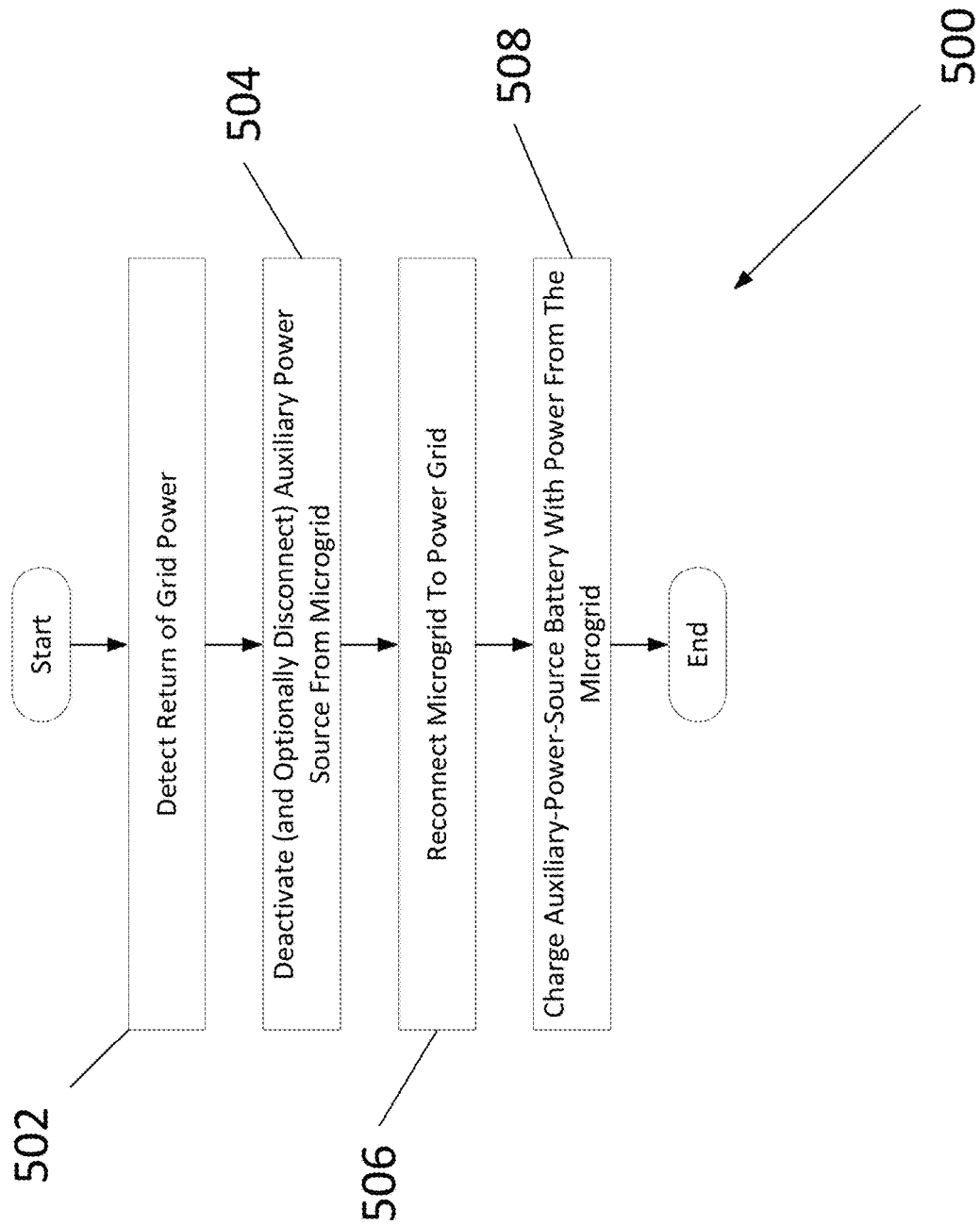
FIG. 5 is a flow diagram of a procedure for deactivating the auxiliary power supply of FIG. 2 in response to a restoration of grid power, and allowing the grid, once again, to power the microgrid of FIG. 2, according to an embodiment.

FIG. 5 is a flow diagram 500 of a procedure for detecting the restoration of power on the grid 104, e.g., after a power outage, and discontinuing the providing of auxiliary power to one or more microgrids 108 (FIGS. 1-2) with an auxiliary power supply 106 (FIGS. 1-2), according to an embodiment.

An embodiment of a procedure represented by the flow diagram 500 is described with reference to FIGS. 1-5.

At a step 502, the auxiliary power supply 106 detects the return of power to the grid 104. For example, in an automatic embodiment, the microgrid interface 240 detects the return of power on the grid 104 by detecting the return of grid power to the microgrid $108_2$ by, for example, detecting the return of a 60 Hz signal to the wires of the microgrid, and transmits, to the auxiliary power supply 104, a wireless signal indicating the return of grid power. In another automatic embodiment, the control circuit 220 receives, via one of the transceivers 210 and 212, a signal from, for example, the grid operator indicating that power has been restored to the grid 104. In a manual embodiment, a user learns that power has been returned to the grid 104 (e.g., by seeing a light connected to another microgrid in the electrical system 102 go "on" or by receiving a notification from the power company on his smart phone), and manually informs the auxiliary power supply 106, e.g., via an application on his smart phone that causes the smart phone to generate and to transmit to the auxiliary power supply a Bluetooth signal indicating the return of grid power. In another manual embodiment, a user enters data indicating the return of grid power directly to the auxiliary power supply 106 via an input device such as a push button on, or a menu displayed by, the auxiliary power supply.

Next, at a step 504, the auxiliary power source 106 deactivates, and may also disconnect from the microgrid $108_1$. For example, in an automatic embodiment, the control circuit 220 deactivates the inverter 216, and causes the relay 214 to disconnect the inverter from the connector 206. In a manual embodiment, the control circuit 220 notifies a user to deactivate the auxiliary power source 106 (e.g., by pushing a button on, or via a selection on a menu displayed by, the auxiliary power source) and then to disconnect the connector 206 from the outlet 222 of the microgrid $108_1$, where the loss (at the auxiliary power source) of the grid-outage signal from the microgrid interface 230 confirms, to the control circuit 220, that the connector 206 has been disconnected from the microgrid $108_1$. The control circuit 220 can use any suitable notification technique, such as causing the user's smart phone to generate the notification. And in a combined automatic and manual embodiment, the control circuit 220 deactivates the inverter 216, causes the relay 214 to disconnect the inverter from the connector 206, instructs the user to disconnect the connector 206 from the microgrid $108_1$, and confirms such disconnection in response to a loss of the power-grid-outage signal from the microgrid interface 230. In alternatives to the immediately preceding embodiments, the auxiliary power source 106 deactivates the inverter 216 and causes the relay to disconnect the inverter from the connector 206, but the connector remains plugged into an outlet 222 of the microgrid $108_1$.

Then, at a step 506, the control circuit 220 reconnects the microgrid $108_1$ to the power grid 104. For example, in an automatic mode, the control circuit 220 transmits a wireless signal via one of the transceivers 210 and 212, or a signal on one or more of the wires of the microgrid $108_1$, which signal causes the circuit breaker $248_1$ to close and to reconnect the microgrid to the power grid 104. In response to grid power being restored to the microgrid $108_1$, the microgrid interface 230 stops generating the power-outage signal, and the control circuit 220 interprets the cessation of the power-outage signal as an indication that the microgrid has been reconnected to the power grid 104. In a manual mode, the control circuit 220 notifies a user, via one of the transceivers 210 and 212 and a smart device such as a smart phone, to manually close the circuit breaker $248_1$, and interprets the cessation of the power-outage signal as an indication that the microgrid $108_1$ has been reconnected to the power grid 104.

Next, at a step 508, the control circuit 220 may charge the one or more batteries 204 of the auxiliary power supply 106 with grid power from the microgrid $108_1$. For example, in an automatic mode, the control circuit causes the relay 214 to connect the battery charger 218 to the connector 206, and the battery charger charges the one or more batteries 204 with grid power from the microgrid $108_1$ in a conventional manner. And if at step 504 the user removed the connector 206 from the outlet 222, the control circuit 220 can notify the user to plug the connector back into the outlet to permit charging of the one or more batteries 204 with grid power from the microgrid $108_1$.

Still referring to FIG. 5, alternate embodiments of the procedure represented by the flow diagram 500 are contemplated. For example, embodiments described in conjunction with FIGS. 1-4 and 6 may be applicable to the procedure represented by the flow diagram 500, and any one or more features described in conjunction with FIG. 5 may be combined with any one or more features described in conjunction with FIGS. 1-4 and FIG. 6.

Figure 6:
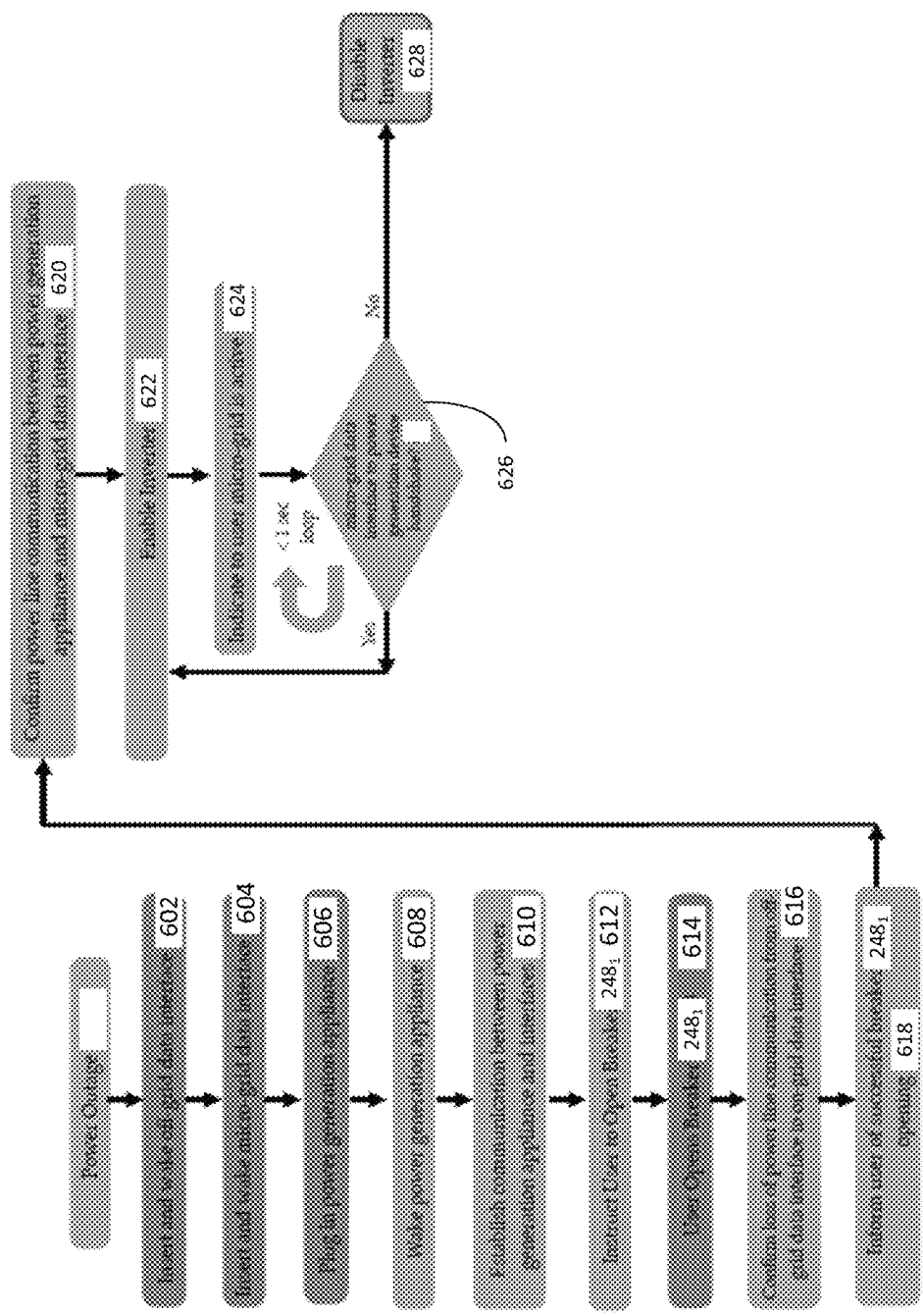
FIG. 6 is a flow diagram of an alternate procedure for using the auxiliary power supply of FIG. 2 to provide auxiliary power to a microgrid of FIG. 2 during loss of grid power, according to an embodiment.

FIG. 6 is a flow diagram 600 of a procedure for detecting a power outage, providing auxiliary power to one or more microgrids 108 (FIGS. 1-2) with an auxiliary power supply 106 (FIGS. 1-2), detecting the restoration of power on the grid 104, e.g., after a power outage, and discontinuing the providing of auxiliary power to one or more microgrids 108

(FIGS. 1-2) with an auxiliary power supply 106 (FIGS. 1-2), according to another embodiment.

An embodiment of a procedure represented by the flow diagram 600 is described with reference to FIGS. 1-3 and 6.

Following a power outage (loss of power on the grid 104), a user performs the following steps in any order.

At a step 602, the user manually inserts into an outlet 234, and wakes, off-grid data interface 240.

Next, at a step 604, the user manually inserts into an outlet 222 of the microgrid $108_1$, and wakes, micro-grid data interface 230.

Then, at a step 606, the user manually plugs the connector 206 into an outlet 222 of the microgrid $108_1$.

In an embodiment, steps 602-606 may have been performed before the power outage.

Next, in response to the power outage and after the performance of the manual steps 602-606, at a step 608, the auxiliary power supply 106 automatically awakens.

Then, at a step 610, the auxiliary power supply 106 automatically establishes communications with the data interfaces 230 and 240.

Next, at a step 612, the auxiliary power supply 106 automatically instructs the user, e.g., via an application on the user's smart phone or via other suitable instruction means, to open the circuit breaker $248_1$.

Then, at a step 614, the user manually opens the circuit breaker $248_1$.

Next, at a step 616, the auxiliary power source 106 automatically confirms that the circuit breaker $248_1$ is open in response to a wireless signal from the interface 240 (connected to the microgrid $108_2$) indicating that the interface 240 is no longer receiving a power-outage signal from the interface 230 (connected to the microgrid $108_1$) on the wires of the microgrid $108_2$.

Then, at a step 618, the auxiliary power source 106 automatically confirms to the user, e.g., via an application on the user's smart phone, that the user successfully opened the circuit breaker $248_1$ and, therefore, disconnected the microgrid $108_1$ from the power grid 104.

Next, at a step 620, the auxiliary power source 106 automatically determines whether the auxiliary power source is still receiving a power-outage signal from the interface 230 via the wires of the microgrid $108_1$ and the connector 206.

Then, at a step 622, in response to determining, at the step 620, that it is still receiving the power-outage signal, the auxiliary power source 106 automatically commences providing auxiliary power to the microgrid $108_1$ via the connector 206 and the outlet 222 into which the connector is plugged by the control circuit 220 enabling the inverter 216 and causing the relay 214 to connect the power output of the inverter to the hot wire of the connector 206.

Next, at a step 624, the auxiliary power source 106 automatically informs the user, e.g., via an application on the user's smart phone, that the microgrid $108_1$ is being supplied with auxiliary power and, therefore, is active. Consequently, the user understands that devices (e.g., a refrigerator) already plugged into the outlets 222 of the microgrid $108_1$ are being powered by auxiliary power, and that the user may be able to power one or more additional devices by plugging each of those one or more additional devices into a respective outlet of the microgrid $108_1$.

Then, at a step 626, the auxiliary power supply 106 automatically periodically (e.g., every one second) checks to determine whether the auxiliary power supply is still receiving the power-outage signal from the interface 230 via the wires of the microgrid $108_1$ and the connector 206. Each periodic check may be called a "handshake." In more detail, while the inverter 216 is active and supplying auxiliary power to the microgrid $108_1$, the microgrid data interface 230 periodically sends a "handshake" signal or data packet to power the auxiliary power supply 106. Proper receipt of the handshake signal by the auxiliary power supply 106 indicates, among other things, that the connector 206 remains plugged into outlet 222 and, therefore, that it is safe to continue supplying power to the microgrid $108_1$. Should communication be lost between the microgrid data interface 230 and the auxiliary power source 106, the auxiliary power source will approximately immediately disable the power inverter 216, thereby removing power from plug 206 to prevent a potential safety hazard to the user. In an embodiment, it is assumed that the handshake between the microgrid data interface 230 and the auxiliary power source 106 takes place in a loop of duration not to exceed approximately one second. Such data rate is well within the capability of the modem 308 (e.g., a TDA5051A modem). Thus, AC power will not be present on the prongs of the connector 206 for more than approximately one second following removal of the connector from the outlet 222.

If, at the step 626, the auxiliary power supply 106 determines that it is still so receiving the power-outage signal, then the auxiliary power supply continues to enable the inverter 216 and to couple a power output node of the inverter to the connector 206 via the relay 214.

But if, at the step 626, the auxiliary power supply 106 determines that it is no longer so receiving the power-outage signal, or receives, from the interface 240, a signal indicating that power to the grid 104 has been restored, then the auxiliary power supply automatically proceeds to a step 628, at which the auxiliary power source automatically disables the inverter 216 and automatically causes the relay 214 to disconnect all power output nodes from the connector 206.

After the inverter 216 is disabled and disconnected from the microgrid $108_1$, the auxiliary power supply 106 automatically informs the user to reconnect the microgrid $108_1$ to the power grid 104 by closing the breaker $248_1$.

From the foregoing it will be appreciated that, although specific embodiments have been described herein for purposes of illustration, various modifications may be made without deviating from the spirit and scope of the disclosure. For example, although the auxiliary power supply 106 (FIG. 2) and the microgrid interface 230 (FIG. 3) are described as sending and receiving signals over the hot wire of the microgrid $108_1$ and the hot prong of the connector 206, one or more of such signals may be sent and received over the neutral wire and the neutral prong of the microgrid and connector, respectively. Furthermore, where an alternative is disclosed for a particular embodiment, this alternative may also apply to other embodiments even if not specifically stated. Moreover, one or more components of a described apparatus or system, or one or more steps of a described method, may have been omitted from the description for clarity or for another reason. In addition, one or more components of a described apparatus or system that have been included in the description may be omitted from the apparatus or system, and one or more steps of a described method that have been included in the description may be omitted from the method.

Example 1 includes an auxiliary-power-supply unit, comprising: a connector; and a controller configured to power a microgrid in response to determining that the connector is plugged into an outlet of the microgrid and the microgrid is uncoupled from a grid.

Example 2 includes the auxiliary-power-supply unit of Example 1 wherein the connector has at least two prongs.

Example 3 includes the auxiliary-power-supply unit of any of Examples 1-2 wherein the controller is further configured to power the microgrid in response to determining that the connector is plugged into an outlet of the microgrid, the microgrid is uncoupled from the grid, and power from the grid is unavailable to power the microgrid.

Example 4 includes the auxiliary-power-supply unit of any of Examples 1-3, further comprising: an inverter; and wherein the controller is configured to power the microgrid by causing the inverter to generate an auxiliary power signal from a battery voltage, and by coupling the auxiliary-power signal to the connector.

Example 5 includes the auxiliary-power-supply unit of any of Examples 1-4 wherein the controller is configured to determine that the connector is plugged into the outlet in response to detecting a signal generated by a microgrid interface plugged into another outlet of the microgrid.

Example 6 includes the auxiliary-power-supply unit of any of Examples 1-5 wherein the controller is configured to determine that the connector is plugged into the outlet in response to detecting a signal generated by a microgrid interface disposed in another outlet of the microgrid.

Example 7 includes the auxiliary-power-supply unit of any of Examples 1-6 wherein the controller is configured to determine that the microgrid is uncoupled from the grid in response to detecting that a breaker that couples the microgrid to the grid is open.

Example 8 includes an auxiliary power supply, comprising: a connector, a battery, and a controller configured to power a microgrid from the battery in response to determining that the connector is plugged into an outlet of the microgrid, and the microgrid is uncoupled from a grid.

Example 9 includes the auxiliary power supply of Example 8 wherein the controller is further configured to charge the battery from the microgrid in response to determining that the grid is powering the microgrid.

Example 10 includes a subgrid assembly, comprising: a microgrid having an outlet; a breaker configured to couple the microgrid to a grid while closed, and to uncouple the microgrid from the grid while open; and an auxiliary power supply including a connector and a battery and configured to provide auxiliary power from the battery to the microgrid in response to determining that the connector is plugged into the outlet of the microgrid, the breaker is open, and power from the grid to the breaker is interrupted.

Example 11 includes the subgrid assembly of Example 10, further comprising: a breaker box disposed between the grid and the microgrid, and wherein the breaker is disposed in the breaker box.

Example 12 includes the subgrid assembly of any of Examples 10-11, further comprising: wherein the microgrid includes a conductive wire, and a microgrid interface coupled to the microgrid and configured to detect an interruption in power from the grid to the breaker and to generate a signal on the conductive wire in response to detecting the interruption.

Example 13 includes the subgrid assembly of any of Examples 10-12, further comprising: another microgrid including another conductive wire, another microgrid interface coupled to the other microgrid and configured, to detect, on the other conductive wire, the presence of the signal generated by the microgrid interface, to detect the absence of the signal from the other conductive wire, and to notify the auxiliary power supply of at least one of the presence of the signal on the other conductive wire and the absence of the signal from the other conductive wire.

Example 14 includes a structure, comprising: microgrids, a breaker box including circuit breakers each coupled between a power grid and a respective one of the microgrids and configured, while closed, to couple the respective microgrid to the power grid, and while open, to uncouple the respective microgrid from the power grid, and an auxiliary power supply including a connector and a battery and configured to provide auxiliary power from the battery to one of the microgrids in response to determining that, the connector is plugged into an outlet of the one of the microgrids, one of the circuit breakers coupled to the one of the microgrids is open, and power from the grid to the one of the circuit breakers is interrupted.

Example 15 includes the structure of Example 14, further comprising another auxiliary power supply: including another connector, including another battery, and configured to provide auxiliary power from the other battery to another one of the microgrids in response to determining that the other connector is plugged into an outlet of the other one of the microgrids, one of the circuit breakers coupled to the other one of the microgrids is open, and power from the grid is interrupted to the one of the circuit breakers coupled to the other one of the microgrids.

Example 16 includes a method, comprising: determining that a connector of an auxiliary power supply is plugged into an outlet of a microgrid, determining that the microgrid is uncoupled from a power grid, and powering the microgrid with the auxiliary power supply.

Example 17 includes the method of Example 16, further comprising determining that power from the grid is unavailable to power the microgrid before powering the microgrid.

Example 18 includes the method of any of Examples 16-17 wherein determining that the connector is plugged into the outlet includes detecting a no-grid-power signal generated by a microgrid interface coupled to another outlet of the microgrid.

Example 19 includes the method of any of Examples 16-18 wherein determining that the microgrid is uncoupled from the power grid includes determining that a breaker that couples the microgrid to the power grid is open.

Example 20 includes the method of any of Examples 16-19 wherein determining that the microgrid is uncoupled from the power grid includes determining that a breaker that couples the microgrid to the power grid is open in response to a signal from a microgrid interface coupled to another microgrid.

The invention claimed is:
1. A subgrid assembly, comprising:
a microgrid having an outlet;
a breaker configured
to couple the microgrid to a grid while closed, and
to uncouple the microgrid from the grid while open; and
an auxiliary power supply including a connector and a battery and configured to provide auxiliary power from the battery to the microgrid in response to determining that
the connector is plugged into the outlet of the microgrid,
the breaker is open, and
power from the grid to the breaker is interrupted;
another microgrid including another conductive wire; and
another microgrid interface coupled to the other microgrid and configured,
to detect, on the other conductive wire, the presence of the signal generated by the microgrid interface, to detect the absence of the signal from the other conductive wire, and
to notify the auxiliary power supply of at least one of the presence of the signal on the other conductive wire and the absence of the signal from the other conductive wire.

2. The subgrid assembly of claim 1, further comprising:
a breaker box disposed between the grid and the microgrid; and
wherein the breaker is disposed in the breaker box.

3. The subgrid assembly of claim 1, further comprising:
wherein the microgrid includes a conductive wire; and
a microgrid interface coupled to the microgrid and configured
   to detect an interruption in power from the grid to the breaker, and
   to generate a signal on the conductive wire in response to detecting the interruption.

4. A structure, comprising:
microgrids;
a breaker box including circuit breakers each coupled between a power grid and a respective one of the microgrids and configured,
   while closed, to couple the respective microgrid to the power grid, and
   while open, to uncouple the respective microgrid from the power grid;
an auxiliary power supply including a connector and a battery and configured to provide auxiliary power from the battery to one of the microgrids in response to determining that,
   the connector is plugged into an outlet of the one of the microgrids,
   one of the circuit breakers coupled to the one of the microgrids is open, and
   power from the grid to the one of the circuit breakers is interrupted; and
another auxiliary power supply
   including another connector,
   including another battery, and
   configured to provide auxiliary power from the other battery to another one of the microgrids in response to determining that
      the other connector is plugged into an outlet of the other one of the microgrids,
      one of the circuit breakers coupled to the other one of the microgrids is open, and
      power from the grid is interrupted to the one of the circuit breakers coupled to the other one of the microgrids.

* * * * *